Aug. 6, 1940.  T. V. SHARP  2,210,821
CORN HUSKING AND SHELLING MACHINE
Filed June 1, 1939  2 Sheets-Sheet 1
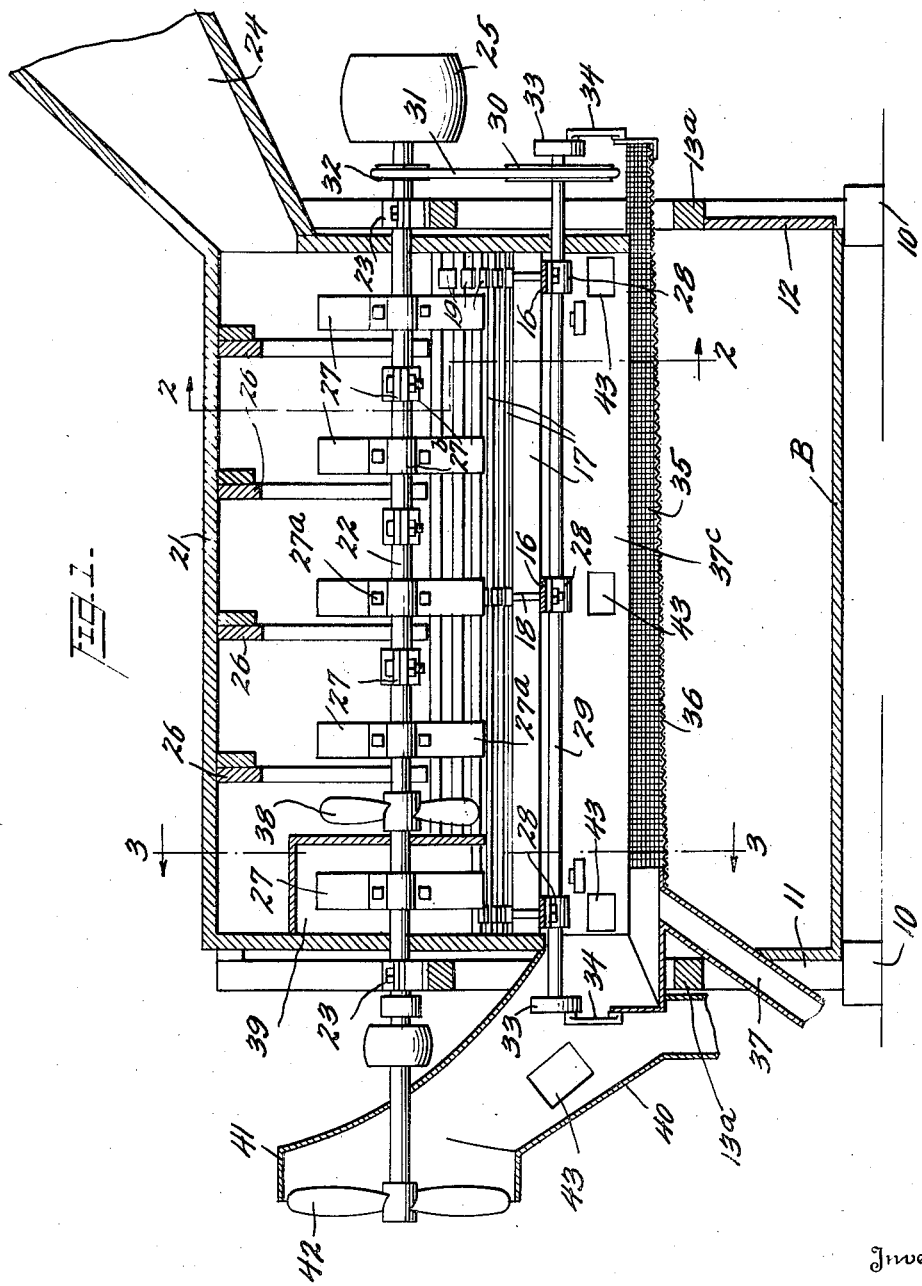
Inventor
Thomas Vincent Sharp,
By Ivan P. Tashof,
Attorney

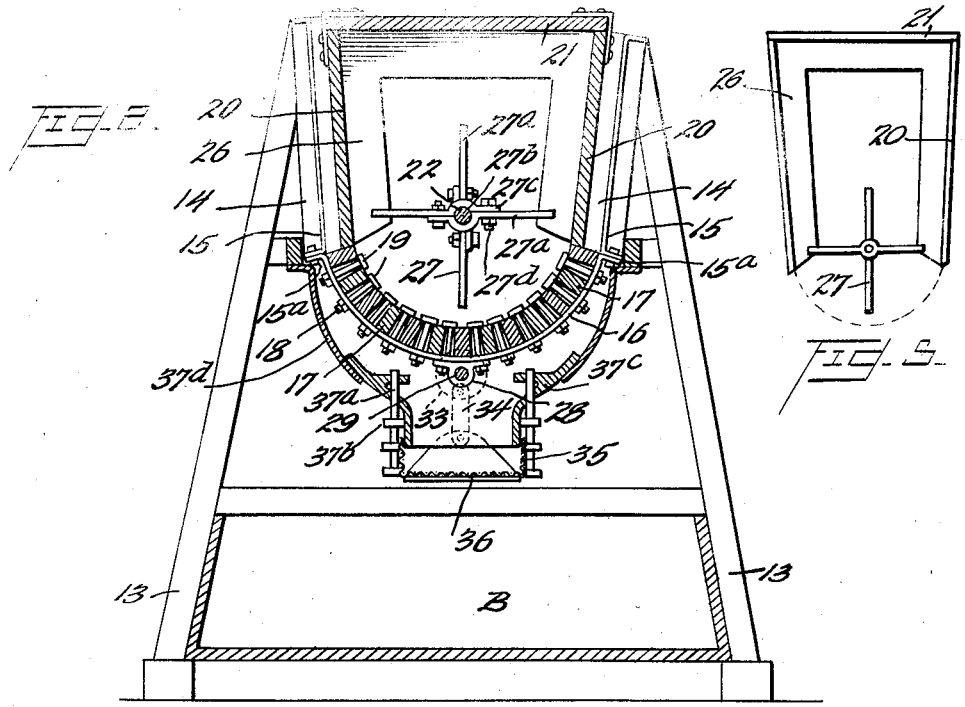
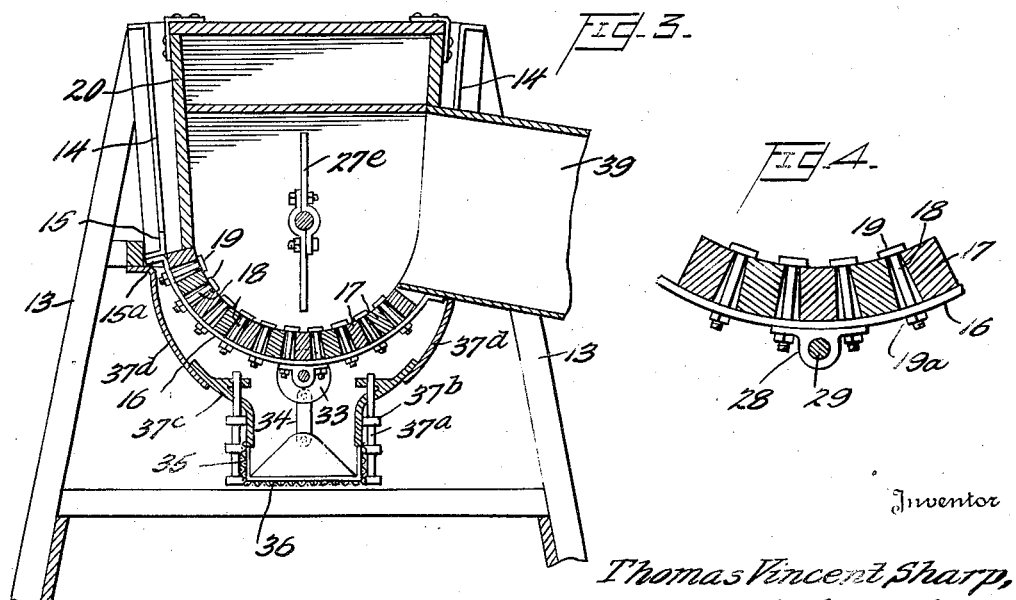

Patented Aug. 6, 1940

2,210,821

UNITED STATES PATENT OFFICE 2,210,821

CORN HUSKING AND SHELLING MACHINE

Thomas Vincent Sharp, Marrero, La.

Application June 1, 1939, Serial No. 276,881

5 Claims. (Cl. 130—5)

The present invention relates to a corn husking and shelling machine.

One object of the invention is to provide a generally improved construction of corn husker and sheller.

A second important object of the invention is to provide a machine for this purpose wherein the grains of corn are delivered in clean fashion from the machine.

A third object of the invention is to provide a novel machine into which unhusked corn is fed and wherein the husk is broken from the cob and torn to pieces while the grains of corn are separated from the cob and dropped into position to be removed.

A fourth important object of the invention is to provide a machine of this character which is simple to operate and can be readily understood.

A fifth important object of the invention is to provide a machine of this character which will be difficult to have its orderly operation disturbed.

A sixth object of the invention is to provide a machine of this character which can be made in any size suitable to meet the requirements of the farm whereon it is used.

A seventh important object of the invention is to provide a machine of this character which, in its operation will destroy all weevils and other noxious insects.

With the above and other objects in view the invention consists in general of certain novel details of construction and combinations of parts hereinafter fully described, illustrated in the accompanying drawings, and particularly pointed out in the appended claims.

In the accompanying drawings, like characters of reference indicate like parts in the several views and:

Figure 1 is a longitudinal median section through a machine constructed in accordance with this invention.

Figure 2 is a section on the line 2—2 of Figure 1.

Figure 3 is a section on the line 3—3 of Figure 1.

Figure 4 is an enlarged detail section through the cylinder of such a machine.

Figure 5 is a partly diagrammatic view of a form of the invention wherein a large space is provided above the beater blades.

In the embodiment of the machine as here illustrated there is provided a base or supporting member 10 at each end of the machine. Mounted on each base member 10 is an end frame one of which is located at 11 and the other at 12. Each of these frame members has its sides tied together with a cross bar 13a. These frames each include a pair of upwardly converging side members 13, having downwardly extending portions 14 which are connected by means of flanges 15, so that a rigid frame is established by connection with these flanges with flanges 15a on arcuate strips 16. Carried by these strips is a spaced series of longitudinally extending bars 17 which are held, as best shown in Figure 4, on the strips 16 by bolts 18 having heads 19 which engage adjacent bars 17, pass through the strips 16 and are provided with nuts 19a so that the bars 17 are firmly mounted on the spaced strips 16. It is to be observed that the bolts 18 at the inner ends fit closely between the strips 17 and, therefore, act as spacers for these strips. The cylinder of the device has walls 20 extending upwardly and flaring outwardly from the upper strips 17 so that there is made a trough-shaped device. This device is provided with a lid 21. Extending concentric to the cylinder is a shaft 22 which is mounted in bearings 23, supported from the side walls 20.

Under these circumstances there is formed a trough-shaped member and at one end this member is provided with an inlet hopper 24. The shaft 22 is driven by any suitable means through a pulley 25 mounted thereon. Extending downwardly from the lid 21 is a series of partitions 26 and on the shaft 22 is fixed a series of beater blades 27 which revolve with the shaft and form corn husking and shelling blades. Each of these blades has a radial blade portion 27a, and an arcuate portion 27b which fits on the shaft. This arcuate portion has an extension 27c through which passes a bolt 27d engaging the opposite blade and thereby holding the blades solidly on the shaft. As will be noted by reference to Figure 2 certain of these blades are located at right angles to other of the blades. However this arrangement is merely the preferred arrangement, and each successive blade may be mounted on the shaft at any desired angle.

Beneath the cylinder is supported a series of bearings 28 wherein is mounted a shaft 29 carrying a sprocket 30 connected by chain 31 with a sprocket 32 fixed on the shaft 22. The shaft 29 has at each end a crank disk 33 which is connected by a link 34 with an agitator screen 35 having a closed floor 36 at its forward end and from this closed floor extends a delivery spout 37. This screen is guided by vertical guiding bars 37a fixed to the lower part of the screen and passing through guide eyes 37b carried by the lower ends of an imperforate cover member 37c attached to the lower ends of housing 37d suitably supported from the main part of the device.

A fan 38 urges material entering the cylinder from the inlet spout 24 toward the forward end of the device. At the forward end of the device is an outlet spout 40 having a horizontal portion 41 whereon is mounted, on the shaft 22, a delivery fan 42. Inspection and clean-out doors 43 are arranged in the side portions of the air duct and screen compartment and also in the side of the delivery spout 40.

Under these circumstances it will be seen that the screen 35, which slopes downwardly toward the front of the machine, will be vertically agitated by the members 33 and 34.

Referring particularly to the device as disclosed in Figures 2 and 3 it will be noted that the side walls 20 of the cylinder or casing extend above the top of the beater blades 27 for a considerable distance, and that these side walls flare outwardly to the cover 21. In the apparatus as actually built there is a larger distance between the uppermost tip of the beater blade and the cover 21 than the actual length of the beater blades, although, it is understood, that this relationship may be changed to some extent, if desired. For example, in one of the successful machines embodying the present structure, the entire length of the beater blades from tip to tip is approximately twelve inches, whereas the distance from the top of the shelling or beater blade to the outside of the cover 21, is approximately fourteen inches. This dimensioning of the machine and positioning of the beater blades provides a larger space above the beating area than in the beating area. As will be hereinafter pointed out this provision of a relatively large space above the beater area proper gives rise to economical and efficient operation. This dimensioning and proportioning of the present device is particularly shown in Fig. 5.

The detailed view of Figure 4 discloses one of the relatively important details of the present invention, that is, the construction of the slotted bottom of the cylinder. As will be noted, the bottom of the cylinder is formed of a number of long strips of rectangular cross section. When these are mounted, as shown on the arcuate strips 16, and spaced by the bolts 18, at their inner ends, the slot so formed is of a greater width at its inner end than at its outer end. This progressive widening of the slot from inside to outside effectually prevents the clogging of the slots during operation.

When the unhusked corn is loaded into the machine, through the passage 24, the kernels and husks will be beaten off the cobs by the action of the members 27 and the kernels directed downwardly by the action of the members 26, although the fan 38 acts to urge the material forwardly. As a consequence the corn will be revolved around in the cylinder and the husk stripped therefrom. At the same time considerable breakage of the cobs will occur. Now at the forward end of the cylinder there is provided a lateral escape or delivery passage 39. Through this passage will be delivered the husks and the coarser parts of the cobs. Meanwhile the smaller broken parts of the cobs, together with the grains of corn, will drop down through the cylinder to rest on the screen 35. Here the fan 42, coupled with the agitation of the screen, will move the fallen parts forwardly but, the cob pieces and other remaining husks, will be carried off by the spout 37. The exhaust fan 42 functions to pull the dust through and out of the husking compartment and also free the shelled corn on the screen from small pieces of broken cobs and trash. Meanwhile, the corn grains will pass through the sieve to collect in the bin B and the scraps of cobs will move forwardly to the delivery spout 37 and there be delivered to any suitable receptacle. It is to be noted that as the husk is much lighter than the corn, during the operation of the machine, the husk is forced forwardly by the action of the incoming un-husked corn, the fan 38 functioning to assist in the forward movement of the husk to the discharge passage 39. It is desired to point out that the non-splatter partitions prevent the corn, upon detachment from the cob, from flying around in the cylinder.

It is to be observed that this machine is simple in construction and will cost approximately one-half similar machines now known in the art. This machine differs from former machines in that these former machines retard the progress of the corn through the machine by closing the cob outlet. As a distinction from this, the cob outlet herein is never closed nor reduced in cross section.

This machine does not have adjustable shutters to hold back the corn during the shelling. Instead, it has a fan to increase the speed at which the husks and cobs move out. The splatter-preventing partitions positively prevent the corn from moving back with the husks and cobs and eighty per cent of the corn is shelled by the first three blades and then passes on down through the separators.

It will be noted that the main parts effecting husking are mounted on a common shaft, together with the fans. The flaring of the cylinder and the shaft aforesaid being concentric to the cylinder provides room above the blades for beating of the corn against the sides and top of the receptacle.

In operation of the ordinary type of sheller, the ears of corn are forced tightly together around the shelling blades and this necessarily takes considerably more power than the present invention.

In actual operation it has been determined that approximately seventy-five per cent of the material is suspended in the space above the beater blades and it is for this reason that the device is especially economical and efficient.

In action, in this invention, the ear of corn is slapped by the blade and strikes the sides of the cylinder a glancing blow, hits the top and then is forced back towards the blades or contacts other ears. Therefore, the motion imparted to the ear is used a number of times before it contacts the blades for a new blow.

It will be seen from the foregoing description of the various parts and operation that the machine, according to the present invention, embodies a corn husking and shelling machine, including an inlet for corn 24, means to beat the corn to separate the kernels or grains from the husk and cob, which comprises the beater blades 27, and a means located within the cylinder to urge the corn cobs and other material within the cylinder in a forward direction. There is also provided an upper lateral outlet for the waste cobs and other material incapable of passing between the members 17. Below the slotted bottom of the cylinder proper there is provided, according to the present invention, means to separate the kernels from the smaller and lighter waste components capable of passing through the slotted bottom of the cylinder, this means being the screen 35. Two outlets are provided for waste material above the screen. These outlets 41 and 37 thus comprising a plurality of means for delivering separated waste material from the space between the slotted bottom of the cylinder and the reciprocating screen.

It is desired to point out that the present machine functions admirably when operating at 550 R. P. M. Of course, the speed of operation can be somewhat increased or decreased without materially effecting the operation of the machine. The machine will husk and shell any size ear of corn without breaking the corn seed. The husks are shredded to such a degree as to fit the shredded material for use as cattle roughage. This roughage may be substituted for good grade of hay.

While the drive for the corn husking and shelling machine has been shown as a chain drive it is obvious that the machine will work equally as well by a belt drive or any other mechanical equivalent.

There has thus been provided a simple and efficient device of the kind described and for the purpose specified.

What is claimed is:

1. A corn husking and shelling device, comprising a cylinder having a bottom, side walls and a top, a longitudinally extending shaft in said cylinder, longitudinally spaced transversely rotatable blades on said shaft means to rotate said blades, said shaft being positioned in said cylinder at a substantially greater distance from the top than the bottom thereof, and said side walls extending upwardly to a substantial height above said shaft and blades, to thereby form a relatively large space above the same adapted to contain a major proportion of the corn undergoing treatment and husks and cobs resulting therefrom, partitions extending substantially continuously inwardly from said top and side walls, said partitions being longitudinally positioned between the paths of movement of said blades and lying in substantially perpendicular planes relative to said shaft so as to prevent the corn from moving with the separated husks and cobs, means to feed the corn into said device, means to remove cobs and husks therefrom, and means to separate and remove shelled and husked corn therefrom.

2. A corn husking and shelling device, comprising a cylinder having a rounded bottom member, outwardly flaring side walls extending from said bottom member, and a top, a longitudinally extending shaft in said cylinder, longitudinally spaced transversely rotatable blades on said shaft means to rotate said blades, said shaft being positioned in said cylinder at a substantially greater distance from said top than said bottom, and said flaring side walls extending upwardly to a substantial height above said shaft and blades to thereby form a relatively large space above the same adapted to contain a major proportion of the corn undergoing treatment and husks and cobs resulting therefrom, partitions extending substantially continuously inwardly from said top and flaring side walls, said partitions being longitudinally spaced between the paths of movement of said blades and lying in substantially perpendicular planes relative to said shaft so as to prevent the corn from moving with the separated husks and cobs, means to feed the corn into said device, means to remove cobs and husks therefrom, and means to separate and remove shelled and husked corn therefrom.

3. A corn husking and shelling device comprising a cylinder having a bottom, side walls, and a top, a longitudinally extending shaft in said cylinder, longitudinally spaced transversely rotatable blades on said shaft means to rotate said blades, said shaft being positioned in said cylinder in a substantially greater distance from the top than the bottom thereof, and said side walls extending upwardly to a substantial height above said shaft, and blades, to thereby form a relatively large space above the same, adapted to contain a major proportion of the corn undergoing treatment and husks and cobs resulting therefrom, partitions extending substantially continuously inwardly from said top and side walls, said partitions being longitudinally positioned between the paths of movement of said blades and lying in substantially perpendicular planes relative to said shaft so as to prevent the corn from moving with the separated husks and cobs, means to feed the corn into said device, means to remove cobs and husks therefrom, said bottom consisting of a plurality of longitudinally extending spaced members forming a series of outwardly tapering slots for the passage of shelled and husked corn, and a screen member positioned below said bottom member to further separate husked and shelled corn from waste residue.

4. A corn husking and shelling device, comprising a cylinder having rounded bottom member, outwardly flaring side walls extending from said bottom member, and a top, a longitudinally extending shaft in said cylinder, longitudinally spaced transversely rotatable blades on said shaft, said shaft means to rotate said blades being positioned in said cylinder at a substantially greater distance from said top than said bottom, and said flaring side walls extending upwardly to a substantial height above said shaft and blades to thereby form a relatively large space above the same adapted to contain a major proportion of the corn undergoing treatment and husks and cobs resulting therefrom, partitions extending substantially continuously and inwardly from said top and flaring side walls, and blades being longitudinally positioned between the paths of movement of said blades and lying in substantially perpendicular planes relative to said shaft so as to prevent the corn from moving with the separated husks and cobs, means to feed the corn into said device, means to remove cobs and husks therefrom, means to separate and remove shelled and husked corn therefrom, said means to remove cobs and husks including a blower means to aid in the ejection of cobs and husks from said cylinder, and the separation thereof from the shelled and husked corn.

5. A corn husking and shelling device, comprising a cylinder having a bottom, side walls, and a top, a longitudinally extending shaft in said cylinder, longitudinally spaced transversely rotatable blades on said shaft, means to rotate said blades, said shaft being positioned in said cylinder at such a distance from the top and bottom that the distance from the uppermost tip of the blades on said shaft to the top is greater than the distance from said tip to the bottom to thereby form a relatively large space above the blades adapted to contain a major proportion of the corn undergoing treatment, and husks and cobs resulting therefrom, partitions extending substantially continuously transversely inward from said top and side walls, so as to prevent the corn from moving with the separated husks and cobs, means to feed the corn into said device at one end, means to remove cobs and husks therefrom at the other end, and means to separate and remove shelled and husked corn therefrom.

THOMAS VINCENT SHARP.